(12) United States Patent
Alkhazraji et al.

(10) Patent No.: US 11,691,325 B2
(45) Date of Patent: Jul. 4, 2023

(54) METHOD TO FABRICATE GLASSY-METAL POLYMER COMPOSITES

(71) Applicant: Khalifa University of Science and Technology, Abu Dhabi (AE)

(72) Inventors: Saeed Mohammed Salem Alhassan Alkhazraji, Abu Dhabi (AE); Mariam Hamad Rashed Mohamed Rashed Alrashed, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 223 days.

(21) Appl. No.: 16/862,924

(22) Filed: Apr. 30, 2020

(65) Prior Publication Data
US 2020/0307057 A1    Oct. 1, 2020

Related U.S. Application Data

(63) Continuation-in-part of application No. PCT/IB2017/056732, filed on Oct. 30, 2017.

(51) Int. Cl.
*B29C 48/00* (2019.01)
*B29C 48/525* (2019.01)
(Continued)

(52) U.S. Cl.
CPC ............ *B29C 48/022* (2019.02); *B29C 48/05* (2019.02); *B29C 48/29* (2019.02); *B29C 48/525* (2019.02);
(Continued)

(58) Field of Classification Search
CPC ..... B29C 48/022; B29C 48/525; B29C 48/29; B29C 48/297; B29C 48/05;
(Continued)

(56) References Cited

U.S. PATENT DOCUMENTS 4,408,888 A * 10/1983 Hanslik ................. B29C 48/395
366/97
4,875,847 A * 10/1989 Wenger ................. B30B 11/243
366/85
(Continued)

FOREIGN PATENT DOCUMENTS

| CN | 104552970 A | | 4/2015 |
|---|---|---|---|
| JP | 03075106 | * | 3/1991 |
| WO | WO2007048759 | * | 5/2007 |

OTHER PUBLICATIONS

M. Rusu, N. Sofian, C. Ibanescu, and D. Rusu, "Mechanical and thermal properties of copper- powder-filled high density polyethylene composites," No. Jan. 2016, 2000.
(Continued)

*Primary Examiner* — Jeffrey M Wollschlager
(74) *Attorney, Agent, or Firm* — 24IP Law Group USA, PLLC; Timothy DeWitt

(57) ABSTRACT

A method for the production of a glassy metal polymer composite is disclosed. The method comprises adding a polymer and a metal to an extruder, wherein the extruder is heated to an extrusion temperature greater than the melting point of the polymer and the melting point of the metal; mixing the metal and the polymer in the extruder for a predefined residence time; and co-extruding the composite from the extruder.

11 Claims, 18 Drawing Sheets

(51) Int. Cl.
| | |
|---|---|
| B29C 48/05 | (2019.01) |
| B29C 48/29 | (2019.01) |
| B29K 23/00 | (2006.01) |
| B29K 25/00 | (2006.01) |
| B29K 505/12 | (2006.01) |

(52) U.S. Cl.
CPC .... *B29K 2023/065* (2013.01); *B29K 2025/04* (2013.01); *B29K 2505/12* (2013.01)

(58) Field of Classification Search
CPC .......... B29K 2023/065; B29K 2025/04; B29K 2505/12; D01F 1/103; D01F 6/04; D01F 6/22; D01F 1/10
See application file for complete search history.

(56) References Cited

U.S. PATENT DOCUMENTS

| | | | |
|---|---|---|---|
| 8,101,680 B1 | 1/2012 | Ramakrishan et al. | |
| 2004/0266957 A1* | 12/2004 | Kobayashi | C08L 81/02 525/437 |
| 2008/0274194 A1* | 11/2008 | Miller | A61K 31/55 424/489 |
| 2012/0022216 A1* | 1/2012 | Alsewailem | B29B 17/0026 525/190 |
| 2013/0065053 A1* | 3/2013 | Kikuchi | B29B 9/16 524/13 |
| 2014/0316036 A1* | 10/2014 | Kosonen | C08L 25/06 524/35 |
| 2016/0347917 A1* | 12/2016 | Urushihara | C08J 5/00 |
| 2017/0148539 A1* | 5/2017 | Prestayko | B33Y 10/00 |

OTHER PUBLICATIONS

Sarikanat, K. Sever, E. Erbay, F. Guner, I. Tavman, a. Turgut, Y. Seki, and I. Özdemir, "Preparation and mechanical properties of graphite filled HDPE nanocomposites," Arch. Mater. Sci. Eng., vol. 50, No. 2, pp. 120-124, 2011.

A. Gungor, "Mechanical properties of iron powder filled high density polyethylene composites," Mater. Des., vol. 28, No. 3, pp. 1027-1030, 2007.

Lemire, Joe, et al., "Antimicrobial activity of metals: Mechanisms, molecular targets and applications," Nature Reviews Microbiology, May 2013.

Plummer, John, Interview with William L. Johnson, Mettler Professor of Materials Science at California Institute of Technology, "Is metallic glass poised to come of age?" Nature Materials, vol. 14, Jun. 2015.

Axinte, Eugen "Metallic glasses from "alchemy" to pure science: Present and future of design, processing and applications of glassy metals," ELSEVIER, Materials and Design 35 (2012) 518-556.

Kündig, Andreas A., et al., "Metallic glass/polymer composites by co-processing at similar viscosities," ELSEVIER, Science Direct, Scripta Materialia 56 (2007) 289-292.

* cited by examiner

Crystalline Atomic Structure

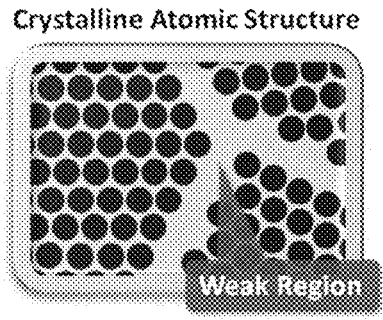

- When cooled, conventional metals form crystalline structures with created weak regions defined as break points.
- Such weak points decrease mechanical strength.

Amorphous Atomic Structure

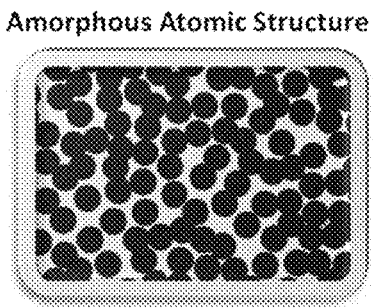

- In contrast, amorphous metals retain their liquid-like atomic structure after cooling.
- The amorphous structure of such materials diminishes internal boundaries to form stronger structures with increased rigidity.

Fig. 7

METHOD TO FABRICATE GLASSY-METAL POLYMER COMPOSITES

BACKGROUND OF THE INVENTION

Field of the Invention

This invention relates to amorphized low melting metals in a polymeric matrix by direct co-melting.

Brief Description of the Related Art

In the 1950s the concept of metallic glasses (MGs or glassy metals) came to light after the successful discovery of Brenner et al. in forming amorphous films of phosphorous-containing alloys by chemical reduction (Brenner, Couch, & Williams, 1950; Wang, Dong, & Shek, 2004). Metallic glasses (also called amorphous metals) have no repeating lattice structure, nor long range of atomic order and hence are approximately isotropic and without grain boundaries (see Fernandez-Baca & Ching, 1995). To prevent their crystalline arrangement, molten metals are traditionally supercooled to form a solid non-crystalline structure or metallic glass. When compared to their crystalline counterparts, the metallic glasses demonstrate high strength properties, uniform plastic deformation and forming abilities while offering a homogeneity in properties down to the nanometric scale (as discussed by Axinte, 2012; Kundig, Schweizer, Schafler, & Loeffler, 2007).

There remains a necessity in finding cost-effective methods of manufacturing the metallic glasses to widen the industrial applications of these amorphous metalloids. One of the reasons lies behind the fact that processing and manufacture of the metallic glasses is relatively expensive due to the need of high-purity materials and critical processing stages for precise and favorable economics intended mainly for scaling-up purposes (as discussed in Ewsuk et al., 2010; Plummer, 2015).

Depending on their desired end qualities, amorphous metals are traditionally prepared by one of the five main methods; evaporation, sputtering, chemical deposition, electro-deposition and rapid quenching from the liquid state (Phariseau & Gyorffy, 2012). Using cautious synthesis practices, these preformed materials can then be filled to different matrices (such as polymers, ceramics, and metals) to form desired composite materials for an extended range of applications. Inevitably, the methods of manufacture might sometimes fail in attaining the desired amorphous (glassy) phase when solid and thus escalating the level of complexity of fabricating and co-processing amorphous metals specifically that majority solid metals adopt crystalline structures (Campbell, 2008).

The metallic glasses are recognized as attractive future materials for many researchers. Turning the metallic glasses from laboratorial materials into a successful commercial venture still remains an industrial challenge (Plummer, 2015).

It is generally well known that extrusion technology is a promising tool for controlled and rapid production offering an eclectic mix of materials. However, no comprehensive studies have been reported in the literature so far on the ability of extrusion technology in forming the metallic glasses or metallic-glass polymer composites.

There remains a need for methods for manufacturing metallic glasses or glassy-metals polymer composites using less complex methods than known in the art. These methods overcome issues associated in stabilizing the attained metallic-amorphous phase known from conventional fabrication methods.

U.S. Pat. No. 8,101,680 (Ramakrishan et al., assigned to Sabic Innovative Plastics, Bergen op Zoom, Netherlands) teaches a method of forming nanocomposites comprising a polymer and metal nanoparticles, in which the metal nanoparticles are disposed with a matrix polymer. The nanoparticles are formed from a metal precursor in an extruder. The extruded material includes not only the metal nanoparticles disposed within the polymeric matrix, but also residues from the metal precursor, which complicates disposal or recycling of the nanocomposite. The method requires the use of expensive and toxic solvents to add the dispersion of the metal nanoparticles.

M. Rusu, N. Sofian, C. Ibanescu, and D. Rusu, "Mechanical and thermal properties of copper-powder-filled high density polyethylene composites," no. January 2016, 2000 demonstrate a reinforced HDPE polymeric matrix with copper metal using a two-roll mill at 155° C. for which the copper remained solid throughout the mixing process. Although the copper in the Rusu et al. publication shows an elastic modulus of ~120 GPa, the tested composites showed a fluctuating trend in their elastic modulus values where only ~10% increase was reached at 8 vol. %. This indicates that the authors' method of manufacture was not capable enough in decreasing the metal-polymer interfacial tension leading to the formation of randomly distributed metallic agglomerates with increasing copper content.

Sarikanat, K. Sever, E. Erbay, F. Güner, I. Tavman, a. Turgut, Y. Seki, and I. Özdemir, "Preparation and mechanical properties of graphite filled HDPE nanocomposites," Arch. Mater. Sci. Eng., vol. 50, no. 2, pp. 120-124, 2011 have filled an HDPE polymeric matrix with graphite in a batch mixer using counter-rotating mixing blades operating at 180° C. for 15 mins. A maximum of 1.42 GPa elastic improvement at 30 wt. % was achieved even though graphite demonstrates a high elasticity of ~28 GPa. This again proves the concept that increasing graphite content increased graphite-HDPE interfacial tensions interpreted by the formed network of agglomerates.

In evaluating previously formed polymeric composites by extrusion, A. Gungor, "Mechanical properties of iron powder filled high density polyethylene composites," Mater. Des., vol. 28, no. 3, pp. 1027-1030, 2007 reinforced a HDPE polymeric matrix with iron powder using a twin-screw extruder operating below the melting point of the iron powder. The obtained results presented a consistent increasing trend of the elastic modulus with increasing metallic content. Nevertheless, the elastic modulus has only reached a maximum of 48% at 15 vol. %. A higher increase would have been expected due the high elasticity contained in iron metal of approximately 210 GPa.

Documents CN 104552970 and US 2017/0148539 both teach a method for production of a polymer composite from a metal and a polymer using an extruder operating at an extrusion temperature.

SUMMARY OF THE INVENTION

There is there for a need for a method for production of a glassy metal polymer composite material in large scale production to meet the growing demand of such metal-polymer composites.

This document teaches a method for the manufacture of a glassy metal polymer composite from a metal traditionally in a crystalline form and a polymer using an extruder operating at an extrusion temperature higher than that of the melting temperature of the metal and the polymer. The metal and the polymer are mixed in the extruder for a predefined residence time; and the glassy metal polymer composite is produced by co-extruding the composite from the extruder.

The method enables the creation of stabilized metallic dispersions in amorphous state in crystalline, amorphous, and semi-crystalline polymers.

In one aspect of the method, the melting point of the metal does not exceed the melting point of the polymer by 35° C.

The polymer can be added to the extruder prior to addition of the metal or together with the metal. The composite in the form of melt is then extruded in room temperature after a minimum residence time of 10 minutes. The extruder residence time can be as low as 10 minutes to form stabilized metallic amorphization in the polymer matrix after extrusion is complete. In other words, 10 minutes is low enough to stabilize the amorphous portion of the composite.

The extruder is in one aspect a screw extruder and has a rotation speed of 100 rotations per minute. A rotation speed of 100 rotations per minute allows to ensure reproducibility of degree of amorphization. The extrusion temperature does not exceed 420° C.

In one aspect, the extruder can be a twin-screw extruder with a heated mixing barrel having twin counter-rotating conical screws, wherein a feedstock of polymer is added to the extruder. The extruder barrel can be firstly fed with a fraction of the feedstock of polymer to form a polymer layer on the surface of the conical screws. When the extruder barrel is firstly fed with some portion of the polymer, this can improve homogeneity of final product.

For the remaining fraction of polymer, the metal can be fed with the polymer concurrently for metals with low melt viscosity, whilst the metal can be fed to the barrel after the polymer, for metals with high melt viscosity. The metal can be fed to the barrel after the polymer at a gradual pace of five to fifteen seconds between each feed The above steps of the method allow for obtaining a glassy polymer composite. In-HDPE and In-PS composites can be produced with the above method The metal is selected from group XIII of the periodic table or is one of a low melting eutectic metal or a deep eutectic metal. Non-limiting examples include indium, sodium mercury and gallium as well as mercury-containing alloys, gallium-containing alloys, bismuth containing alloys, lead containing alloys, tin containing alloys, cadmium containing alloys, zinc containing alloys, indium containing alloys, thallium-containing alloys, and NaK containing alloys.

The polymer is high density polyethylene or polystyrene. The polymer could also be polydimethylsiloxane or polycarbonate, but this is not limiting of the invention.

The method can be used to produce molded articles comprising the metal-polymer composites, such as fibers.

The resultant composite is found to contain metallic materials in a non-crystalline (amorphous) form.

The fabricated extrudates can have antibacterial effects. It is known, for example, that indium "tricks" bacteria to replace iron absorption (Lemire, Harrison, & Turner, 2013). This means that the bacterial cells cannot function and thus the cells stop living.

BRIEF DESCRIPTION OF THE FIGURES

For a more complete understanding of the present invention and the advantages thereof, reference is now made to the following description and the accompanying drawings, in which:

FIG. 7 shows the atomic structure without grain boundaries.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
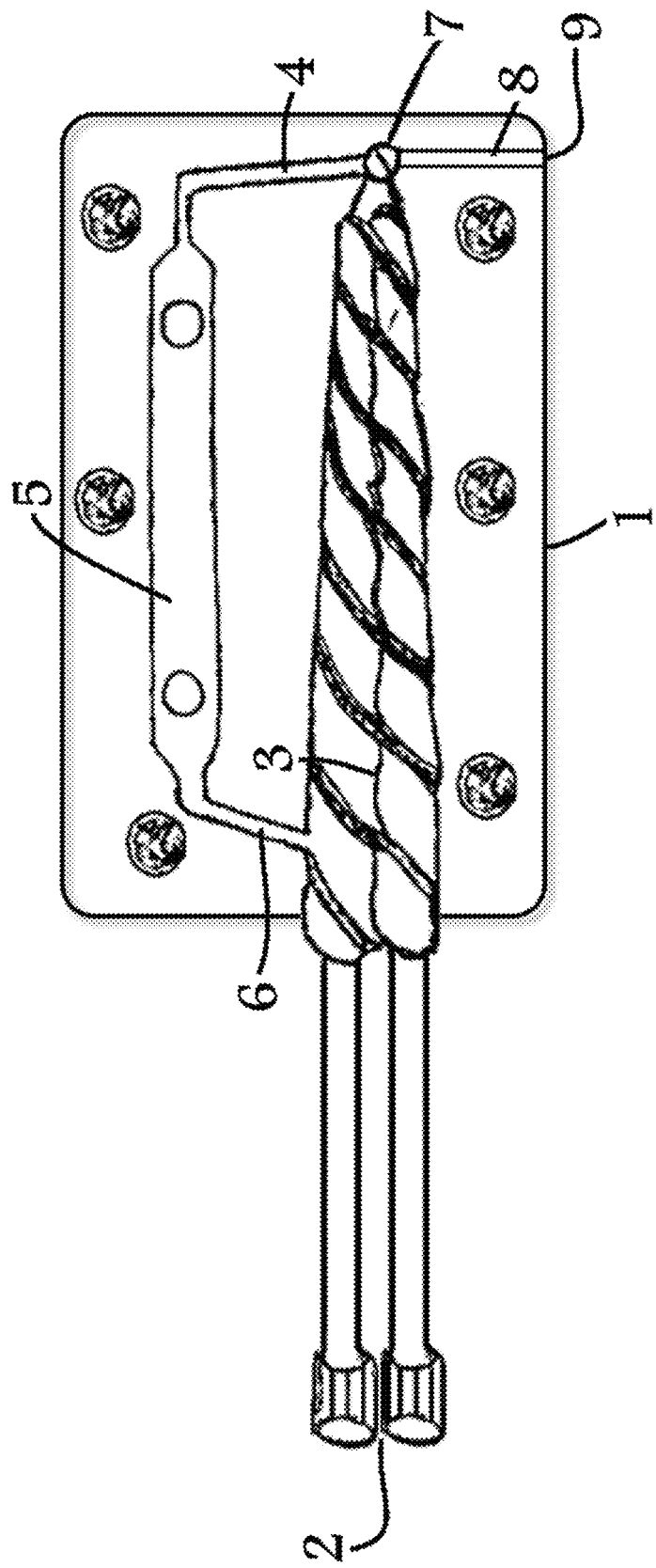
FIG. 1 shows a twin-screw extruder in accordance with a preferred embodiment of the present invention.

FIG. 1 shows a top view of a twin-screw extruder 1 with a heated mixing barrel having twin counter-rotating conical screws 2. A bypass channel 5 is connected to the back of the mixing barrel through a first channel 6 and to the end of the barrel through a second channel 4. A metal and a polymer (referred to commonly as "feedstock") are passed from a hopper (not shown) to position 3 on the counter-rotating conical screws. It is known that molten metal has a higher tendency is adhere strongly to the surface of the metal conical screws 2 instead of blending with the polymer. It is therefore important to firstly feed the barrel of the extruder 1 with some polymer to form a polymer layer on the surface of the conical screws 2 and thus minimize metallic adhesion and increase the overall homogeneity of the final product. For the remaining feedstock, it will be appreciated that the metal could be fed in either one of two options. The first option is chosen when the melt viscosity of the metal is low and the polymer and the metal can be fed into the barrel at the same time. Should the melt viscosity of the metal be high, then the metal can be fed after the polymer to facilitate mixing and melt flow in the barrel.

The twin-screw extruder 1 includes further a bypass valve 7 which redirects material from the bypass channel 5 back into the barrel with the twin-screws through the position 3 or to an output 9. The twin-screw extruder 1 used in this work is a lab scale equipment and thus, similar extruders can be purchased to producing equivalent results of this invention.

The movement of the twin conical screws 2 moves the fed materials of polymer and metal towards the end of the barrel to the second channel 4 and the flowing melt circulates several times through the bypass channel 5, the first channel 6, and the second channel 4 until a set period of time elapses. The melt is then directed through the bypass value 7 and passes to an extrusion die 9 through the output channel 8.

In one aspect of the invention, the metal is selected from Group XIII of the periodic table and the polymer is one with a similar melting temperature as the metal. In a non-limiting example, the polymer is high density polyethylene (HDPE) and the metal is indium. Indium melts at 156.6° C. and has a density of 7.31 g/cm$^3$. HDPE has melting point ranging from 115-135° C. and a density of 0.93-0.97 g/cm$^3$. In this aspect of the invention, the temperature of the mixing barrel was set at 180° C., which is above the melting temperature of both the Indium and the HDPE. The residence time in the mixing barrel was kept to a minimum of 10 minutes, which means that stabilized glass metal polymer composites can be formed in a residence time as low as 10 minutes.

Another polymer that could be used is polystyrene which is mixed with indium metal as a reinforcement using the method of this invention. Since polystyrene is an amorphous polymer, 190° C. was the set barrel temperature for a simplified flow of the polystyrene/indium melt within the barrel of the twin-screw extruder 1.

The twin-screw extruder 1 has in one aspect a counter rotating configuration. It will be appreciated that the method of production of the metal polymeric composite outlined in this document is not limited to production using the twin-screw extruder, but that other types of extruders may be used. For example, it would also be possible to use a single-screw extruder.

Figure 2:
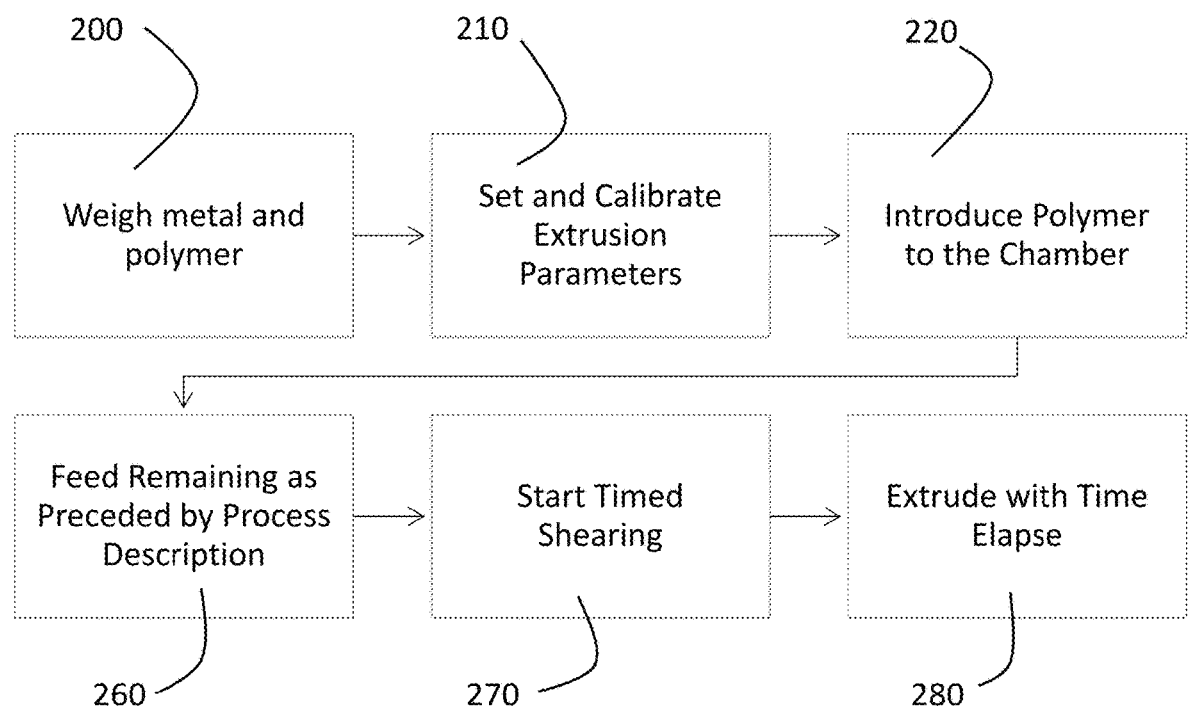
FIG. 2 shows a flow diagram of the method in accordance with a preferred embodiment of the present invention.

FIG. 2 shows a flow diagram of the method of production. It will be appreciated that many of the steps set out below can be carried out concurrently. In a first step 200 the amounts of the metal and polymer are pre-weighed and then are fed to the extruder 1 through a feeding hopper. The amounts of the polymer and the metal chosen are dependent on the weight concentrations required in the metal polymeric composite. As noted above, step 220 comprises adding firstly a fraction of the pre-weighed polymer to the barrel to minimize metal-screw adhesion. The order in feeding the remaining feedstock in step 260 is dependent on the viscosity of the metal, as was stated above.

The extrusion parameters of the twin-screw extruder 1 are set in step 210 to the required values, e.g. the extrusion temperature $T_{extr}$, the rotation speed and the shearing time. The extrusion temperature $T_{extr}$ could be set to a maximum of 420° C. which all depends on the melting point of the polymers and the metals to be used. For example, as noted above, the temperature used in the barrel of the extruder would be set to be 180° C. for the indium/HDPE system.

In one aspect, the polymer is firstly placed into the twin-screw extruder 1 by feeding at step 220 at a gradual pace, with five to fifteen seconds between each feed step 220. After waiting for a few minutes to ensure that the polymer is completely melted in the twin-screw extruder 1, the metal is added subsequently to the extruder 1 at a gradual pace with five to fifteen seconds between each feed. In another aspect, it is also possible to add the polymer along with the metal at the same time (i.e. combine steps 220 and 260) and this is done with a low viscosity melt to promote shearing. The adding of the metal to the polymer later is carried out for a high viscosity melt.

The amount of feedstock used per feed depends on the capacity of the extruder and the metallic weight concentrations required in the final extrudate.

The residence time is reaches in step 270 and the twin-screw extruder flushed in step 280 by changing the position of the bypass valve 7. The extrudate is the resulting metal-polymer composite.

EXAMPLE

In a non-limiting example, indium supplied by Sigma Aldrich was used as the metal and cut up into smaller pieces. High density polyethylene (HDPE) supplied by Sigma Aldrich was used as the polymer. The extrusion temperature was set to be 180° C. and the rotation speed to be 100 rotations/minute. Various concentrations of indium in the extrudate were used: 0.1, 1, 5, 10 and 20% by weight, as well as a control extrudate with no indium loading. The mixing time (shearing time) was set to 10 minutes for which materials could thermally blend and then were extruded after time elapse.

Figure 3:
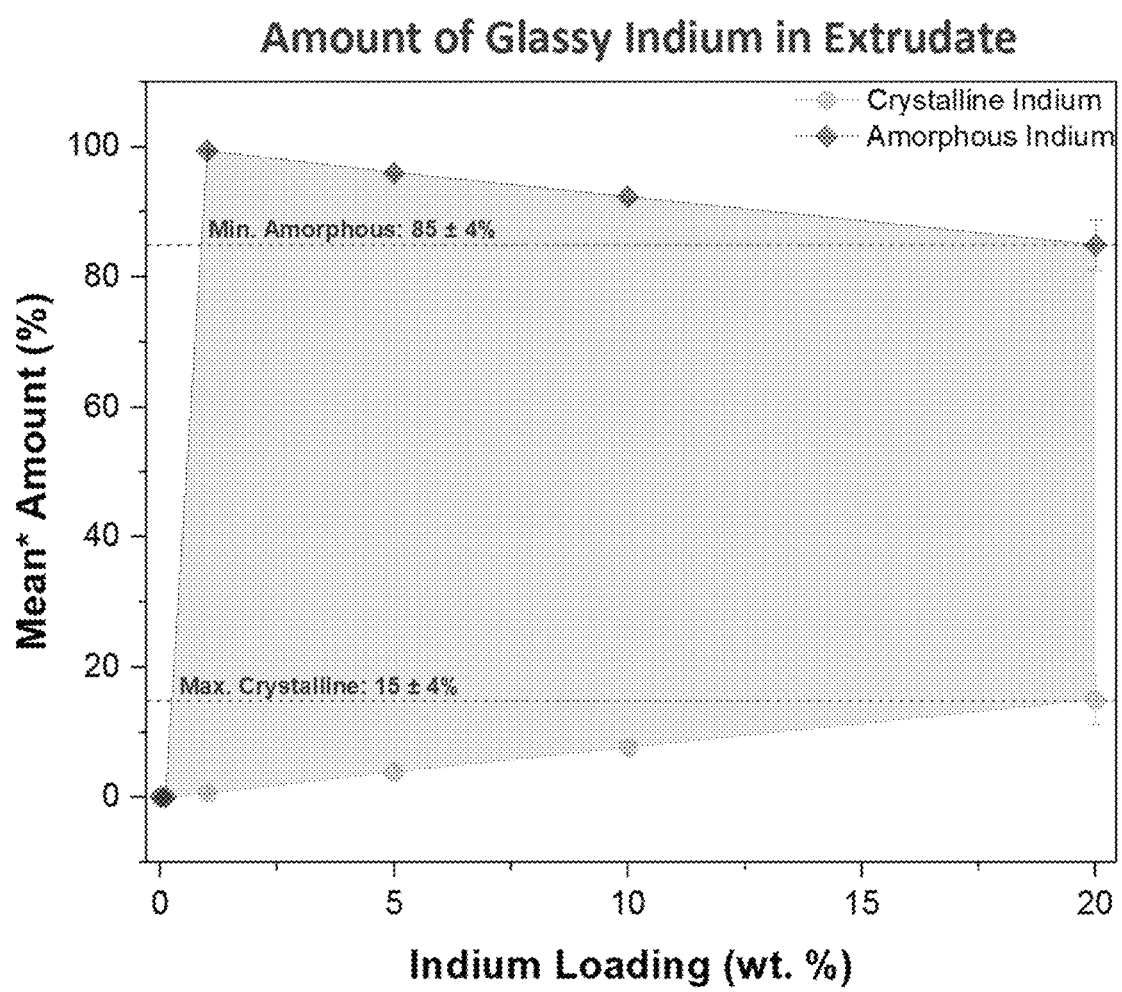
FIG. 3 shows an amount of glassy indium in the extrudate.

The obtained samples were thermally analyzed under nitrogen atmosphere using Discovery DSC-TA Instruments. Accordingly, it was found that a substantial amount of indium is in an amorphous (glassy) state contained within the polymeric matrix of the formed extrudates, as shown in FIG. 3. The data relating to indium's crystallinity within the extruded composites was calculated by integrating the metallic endothermic peaks of the composites to produce the value of $\Delta H_{Melt,\ Exp}$. This value was used in the crystallinity equation 1 and using 24.26 J/g as indium's specific enthalpy of melting ($\Delta H_{Melt,\ Indium}°$) the results in FIG. 3 were calculated.

$$X_{Indium}(\%) = \frac{\Delta H_{Melt,\ Exp}}{\Delta H°_{Melt,\ Indium}} \times 100\% \quad \text{Eq-1}$$

The calculated metallic crystallinity shown in FIG. 3 reveal that only a maximum of approximately 13% of crystalline indium is contained within the polymeric domains of the extrudates where the remaining content is in the form of amorphous metallic dispersions.

Figure 4:
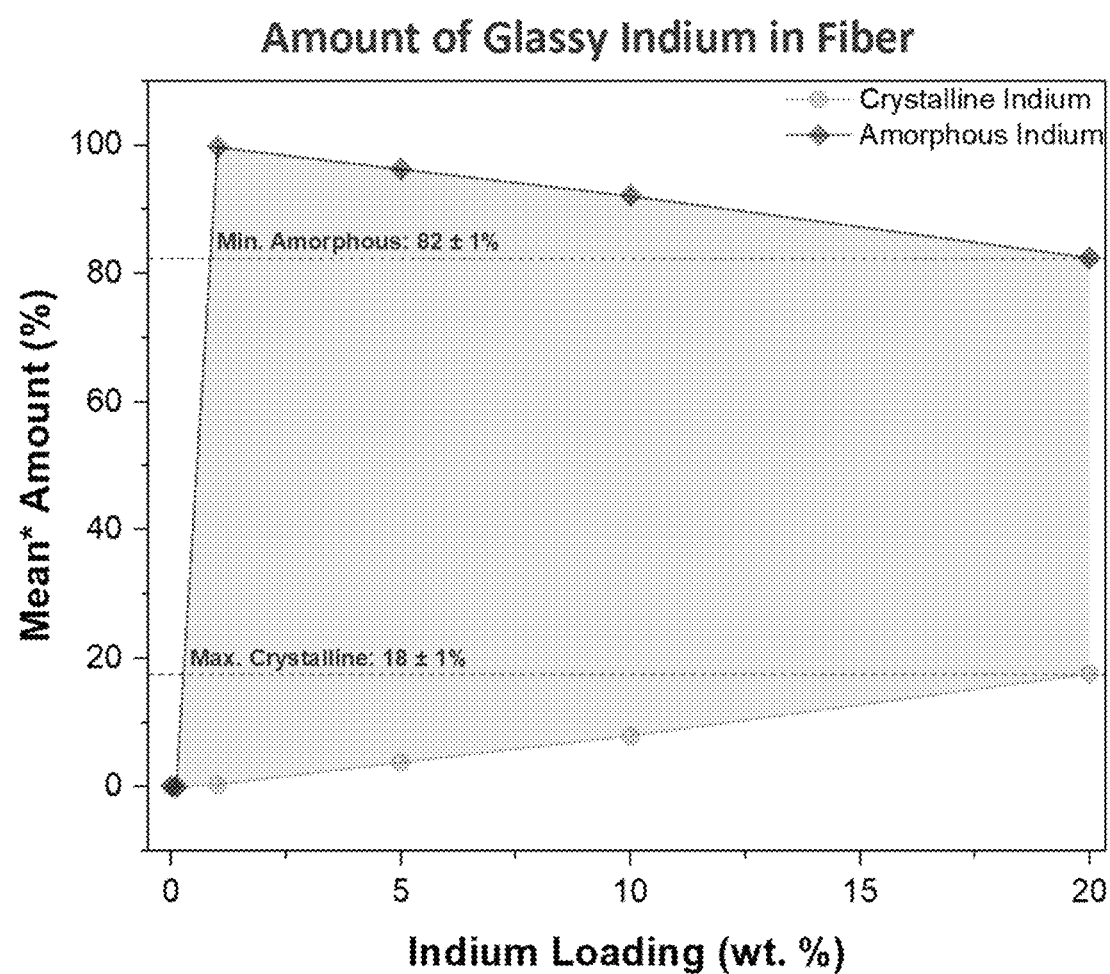
FIG. 4 shows an amount of glassy indium in the fiber.

FIG. 4 shows similar results in which extrudates were converted to the form of fibers. The fibers will be discussed in more detail below.

As is generally known, the addition of filler particles, such as indium, to a polymeric matrix is expected to affect the crystallinity behavior of both the filler particles and the polymeric matrix. Thus, the overall composite properties are expected to change accordingly.

Figure 5:
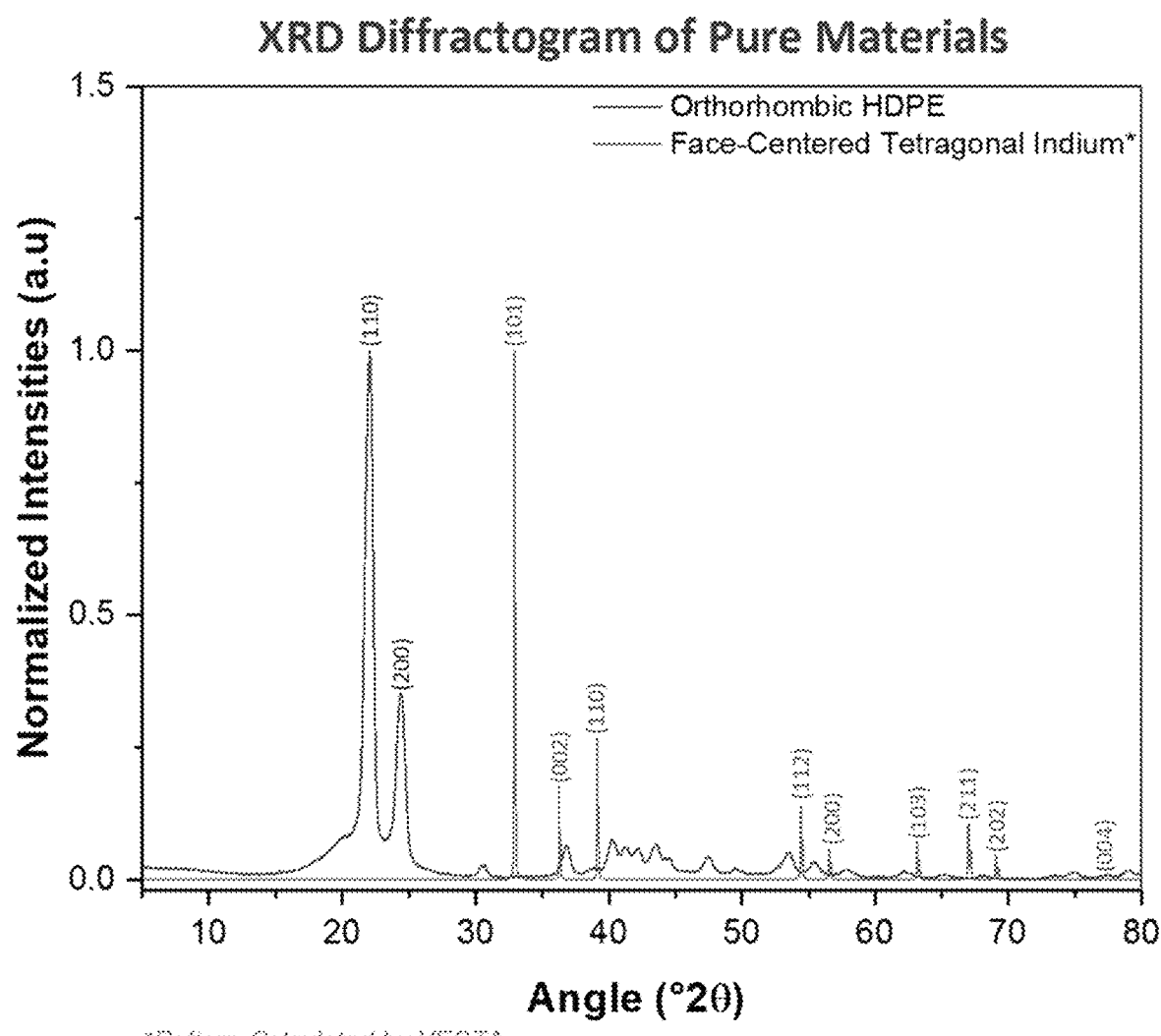
FIG. 5 shows an X-ray diffractogram of crystalline raw materials.

To understand this effect, the extrudates were analyzed by a PANalytical XPert Pro solid diffractometer system using 1.54 Å wavelength emitted by Cu K-alpha anode system. As shown in FIG. 5, the obtained diffraction data were converted to relative intensity vs. ° 2Θ tabulated results and then were compared with those of pure indium for characterization.

It can be seen in FIG. 5 that polyethylene typically crystalizes in the form of an orthorhombic structure shown by the basic intensity peaks at 2θ≈21.9° and 24.2° corresponding to the (110) and (200) reflections. Crystalline indium on the other hand is known to be made up of a face-centered tetragonal unit cell identified by the major and sharp intensity peaks in the (32-90)° 2θ range. Accordingly, these sharp intensity peaks of crystalline indium demonstrate that the atomic arrangement in metals is more highly ordered in structure than that of crystalline polymers.

Figure 6:
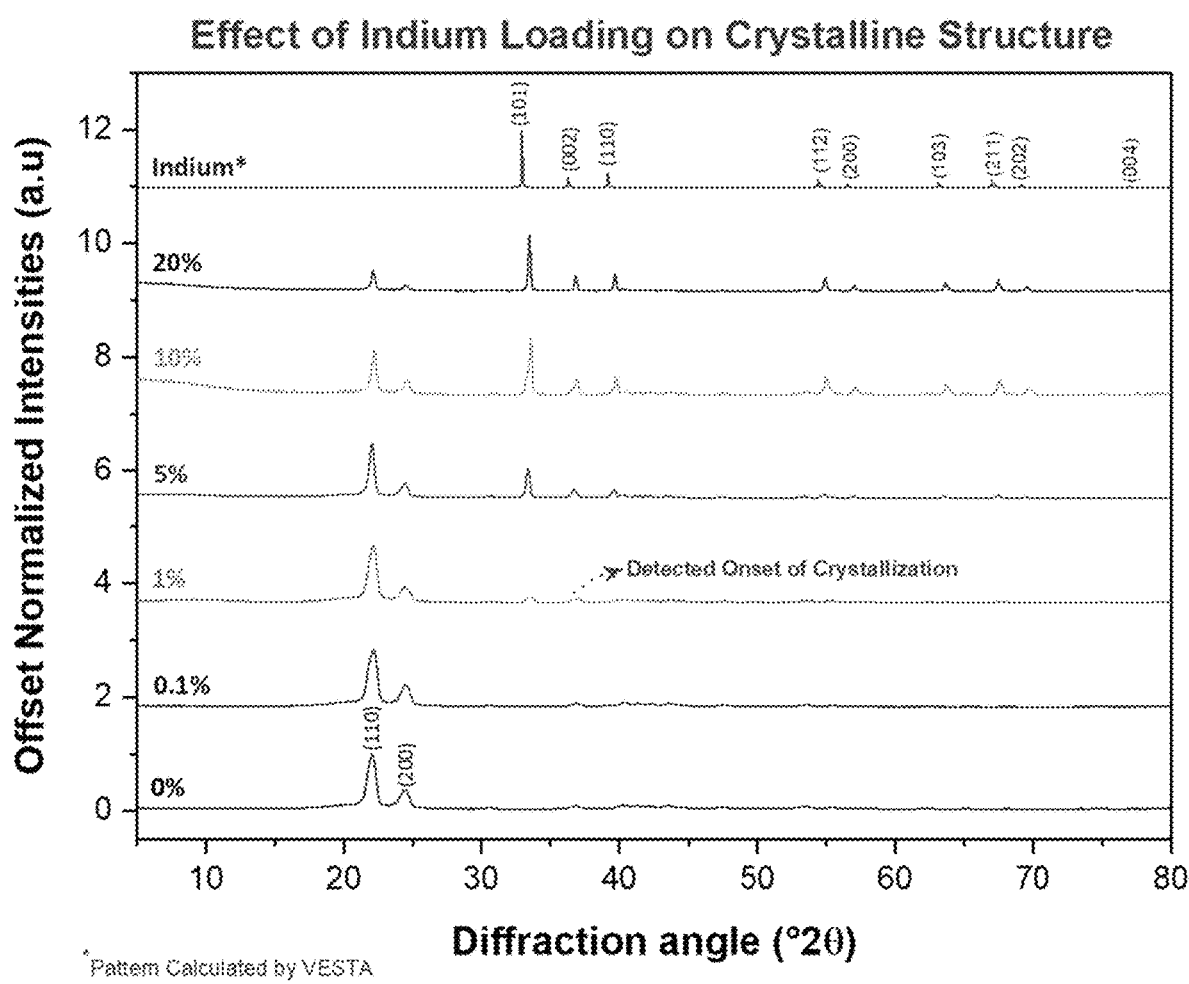
FIG. 6 shows effect of loading of indium on crystalline structure.

FIG. 6 shows that HDPE crystallinity drops significantly with increasing indium content noticed by the decreasing intensities of the (110), (200), (210) and (020) reflections. Additionally, the 0.1 wt. % diffractogram indicates the formed composite structure by direct co-melting prevents the amorphous indium particles in the extrudate from crystallizing, as would be expected normally after extrusion. Hence, it is hypothesized by the inventors that the extrusion conditions formed polymeric entrapments preventing indium particles from crystalizing where upon cooling, solid amorphous dispersions of indium were created instead.

Moreover, as the metallic content in the HDPE polymeric matrix increases to 1 wt. %, an onset of indium crystallization is detected through the increasing intensity peaks of the (101), (002) and (110) metallic reflections which coincides clearly with the computed onset by the above DSC curves. Since the diffractogram of FIG. 5 indicates that the higher indium content decreases the polymeric crystallinity, it is anticipated that such decrease also weakens the polymer's ability in entrapment allowing the indium particles to easily coalesce and crystalize. Although increasing indium content triggers the onset of indium crystallization, it is still believed that a large portion of the indium particles remains in amorphous (glassy) state, as evidenced by FIG. 3. Even after crossing the onset of crystallization to a maximum of 20 wt. %, the above DSC results have quantified that still 85±4% of indium remains amorphous endorsing the stabilized amorphous dispersions of indium in the HDPE polymeric matrix.

Analyzing Statistical Improvements in Elastic (Young's) Modulus

The objective of this test was to demonstrate statistically that tensile properties improve with increasing indium content while using the properties of pure HDPE as a reference. As shown in Table 1 below, all the data sets follow a normal distribution trend except for yield strength values of 0.1% loading specimens. Thus, graphical interpretations were used instead in this particular case when drawing expressive conclusions about the effect of 0.1 wt. % indium loading on yield strength.

TABLE 1

| Loading effect t-Paired hypothesis test using 95% CI significance level | | | | | | |
|---|---|---|---|---|---|---|
| In wt. % | 0 | 0.1 | 1 | 5 | 10 | 20 |
| Elastic Modulus (0-3) mm Segment | | | | | | |
| Normally Distributed | Yes | Yes | Yes | Yes | Yes | Yes |
| % Variation | 7.251 | 2.133 | 9.446 | 7.914 | 2.931 | 10.49 |
| t-Paired Test (P-Value) | — | 0.001 | 0.068 | 0.003 | 0.001 | 0.011 |
| Statistical Improvement | — | Yes | Yes | Yes | Yes | No |
| Yield strength | | | | | | |
| Normally Distributed | Yes | No | Yes | Yes | Yes | Yes |
| % Variation | 5.247 | 2.139 | 6.775 | 4.693 | 5.201 | 3.963 |
| t-Paired Test (P-Value) | — | 0.024 | 0.030 | 0.311 | 0.015 | 0.099 |
| Statistical Improvement | — | Yes | Yes | No | Yes | No |
| % Elongation at Yield | | | | | | |
| Normally Distributed | Yes | No | Yes | Yes | Yes | Yes |
| % Variation | 8.854 | 60.064 | 2.116 | 1.761 | 2.590 | 11.271 |
| t-Paired Test (P-Value) | — | 0.312 | 0.975 | 0.899 | 0.970 | 0.731 |
| Statistical Improvement | — | No | No | No | No | No |
| % Elongation at Break | | | | | | |
| Normally Distributed | Yes | Yes | Yes | Yes | Yes | Yes |
| % Variation | 24.957 | 97.034 | 36.649 | 43.169 | 47.969 | 66.130 |
| t-Paired Test (P-Value) | — | 0.968 | 0.998 | 0.888 | 0.999 | 0.999 |
| Statistical Improvement | — | No | No | No | No | No |

Statistically, there is a 95% confidence level that HDPE matrix experiences higher stiffness and rigidity when reinforced with the indium particles by the method of production of this document. This is proven by the marked improvement in elastic modulus where a maximum of 1052±31 MPa at 10 wt. % loading was achieved with only 3.3% variation in measurements. Such increase was not only due to the fact that indium is recognized as a stiffer material than pure HDPE, but also due to the formation of amorphous indium in the polymeric entanglements when directly co-melted with HDPE.

Y. Sakurai, Y. Hamakawa, K. Shirae, T. Masumoto, and K. Suzuki, *Current Topics in Amorphous Materials: Physics & Technology*. Elsevier Science, 2013. have stated that amorphous metals reveal excellent stiffness, tensile strength and fracture resistance properties when compared to conventional crystalline materials. The reason behind such fact is that crystallization typically creates structural defects and irregularities recognized as weak/breaking points which allow the atoms in crystalline planes to slip past one another whenever subjected to external stresses. Consequently, a limitation in tensile strength is encountered restricting the materials reliability in resisting higher loads.

As illustrated in FIG. 7, the molecular disorder in amorphous materials diminishes away the weak-point effect that would normally exist in a crystalline structure while sustaining strength and elasticity (Cherepanov, 2013; Garon, 2006; Stevick, 2012). In addition, the random orientation offered in an amorphous structure creates substantial amounts of free volume defined as 'wasted space' between dispersed particles which widens up upon external stresses offering a higher strength and better resistance than crystalline materials would typically show ("Amorphous Metal Alloys," 2011) ("Amorphous Metal Alloys," 2011) ("Amorphous Metal Alloys," 2011, available at http://appropedia.org/Amophous_Metal_Alloys (accessed 15 Sep. 2017)). Hence, the indium metal particles offer a dual effect in enhancing the polymeric elastic properties due to contained elasticity and acquired amorphous structure when directly extruded with HDPE.

Figure 8:
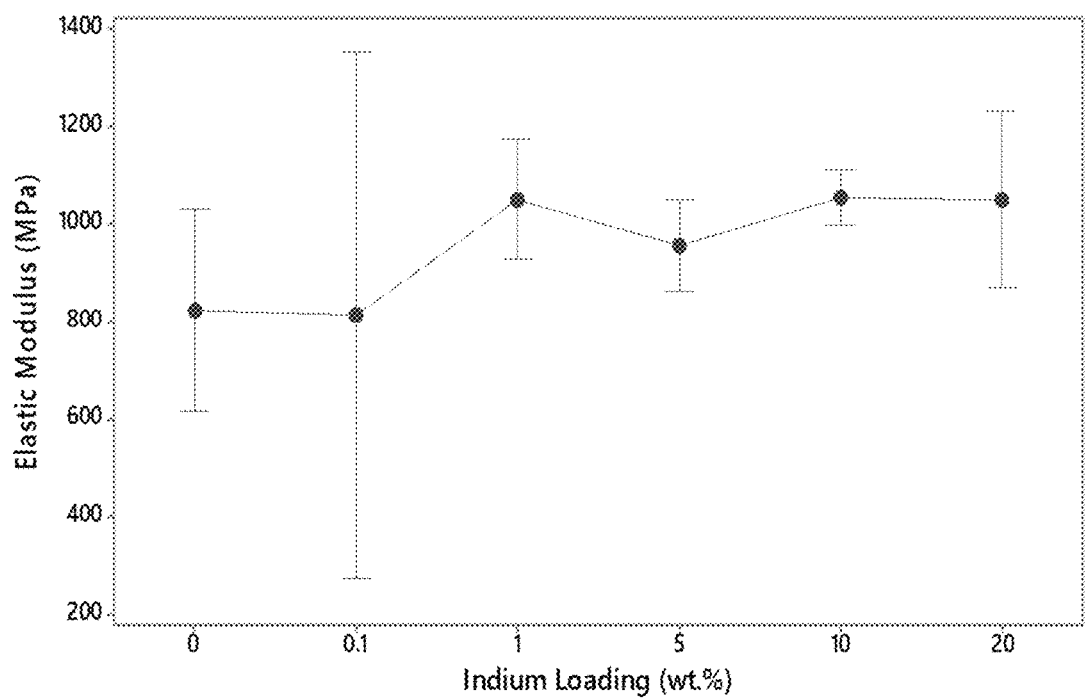
FIG. 8 shows the effect of indium loading on the elastic modulus.

Since indium has a high elastic modulus of (10-13) GPa, a dramatic increase exceeding 100% was expected. However, FIG. 8 indicates that elastic modulus has reached a maximum of only around 40% at 10 wt. % loading. Since the HDPE polymeric matrix contains indium in the form of agglomerates, it is suggested that further additions of indium formed large networks of agglomerates that prevented the indium particles from dispersing further in the other remaining domains of the HDPE polymeric matrix.

As a result, tensile improvements reached a maximum where higher loadings have little or no influence on tensile properties. This concept is emphasized as shown in the Table 2 where a maximum elastic modulus of 1052±31 MPa is obtained at 10 wt. %. which starts to drop by ~2% when indium loading is doubled to 20 wt. %. It should be noted moreover that the obtained standard deviations in Table 2 represent the statistical distribution between the measurements without including the instruments tolerance in performing the tests.

Figure 9:
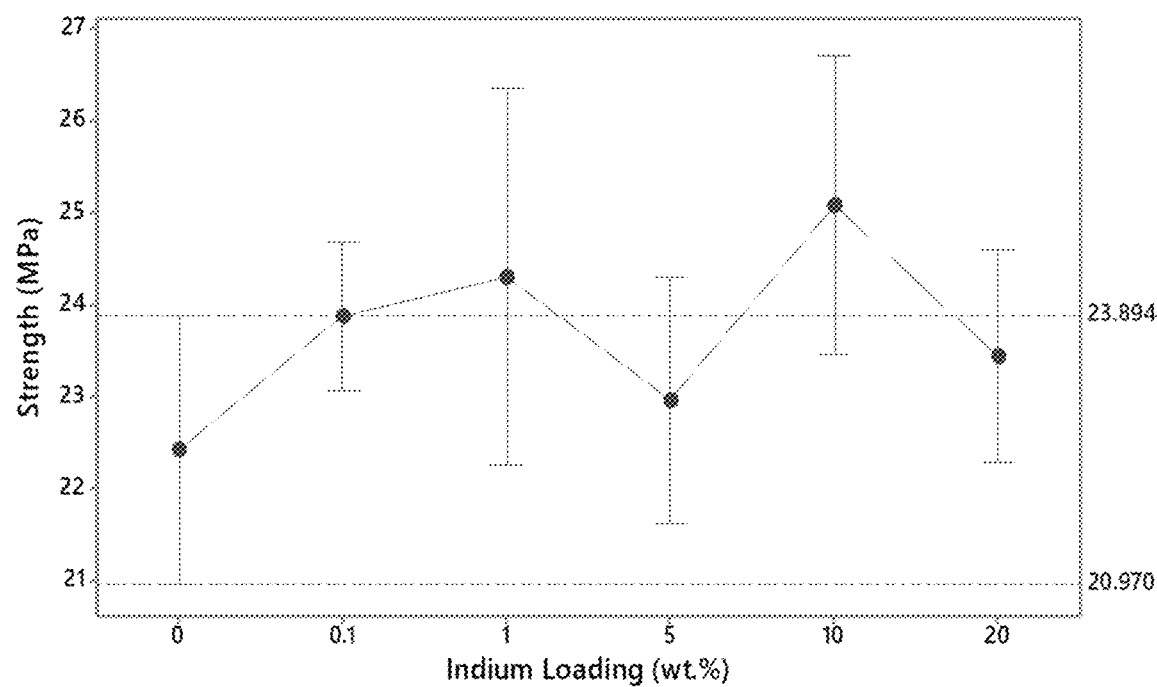
FIG. 9 shows the effect of indium loading on yield strength.

Similar results were also observed in analyzing yield strength results. FIG. 9 shows, the formed metallic composites bore the subjected stresses and showed slight improvements in yield strength to reach a maximum increase of 13% at 10 wt. % loading emphasizing the fact that the composites showed dominating polymeric properties. Since the 0.1 wt % data were not normally distributed, it might be plausible to mention that an increasing trend in yield strength is observed at 0.1 wt. % loading thus, future reproducibility experiments might be required to statistically conclude the trend.

On the contrary, Rusu et al. found that addition of copper metal to HDPE using a two-roll mill decreases yield strength to a minimum of 44%. Not only that, but reinforcing the HDPE polymeric matrix with iron metal as presented by Gungor also demonstrated a significant decrease in yield strength by 19% with increasing iron content.

This confirms the concept that the direct co-melting of the polymeric material and the amorphous metal of this disclosure enhances the metallic dispersion in the HDPE polymeric matrix specifically when compared to other melt mixing techniques. Thereby, it is statistically concluded that the addition of indium by direct co-melting maintains the composites' polymeric properties while improving stiffness and rigidity. This finding offers great industrial benefits for applications demanding high modulus HDPE composites with sustained load resistance qualities.

TABLE 2

Loading effect on mechanical properties
Indium Loading (wt. %)

| Property | 0 | 0.1 | 1 | 5 | 10 | 20 |
|---|---|---|---|---|---|---|
| Elastic Modulus (MPa) | 752 ± 54.5 | 1009 ± 21.5 | 1051 ± 99.3 | 956 ± 75.7 | 1052 ± 30.83 | 1031 ± 108.1 |
| Yield strength (MPa) | 22 ± 1.18 | 24 ± 0.511 | 24 ± 1.65 | 23 ± 1.08 | 25 ± 1.31 | 23 ± 0.929 |
| Elongation at Yield (%) | 13 ± 1.17 | 16 ± 9.37 | 12 ± 0.25 | 12 ± 0.22 | 12 ± 0.3103 | 13 ± 1.419 |
| Elongation at Break (%) | 404 ± 101 | 132 ± 128 | 226 ± 82.8 | 284 ± 123 | 92 ± 44.29 | 92 ± 60.76 |

Figure 10:
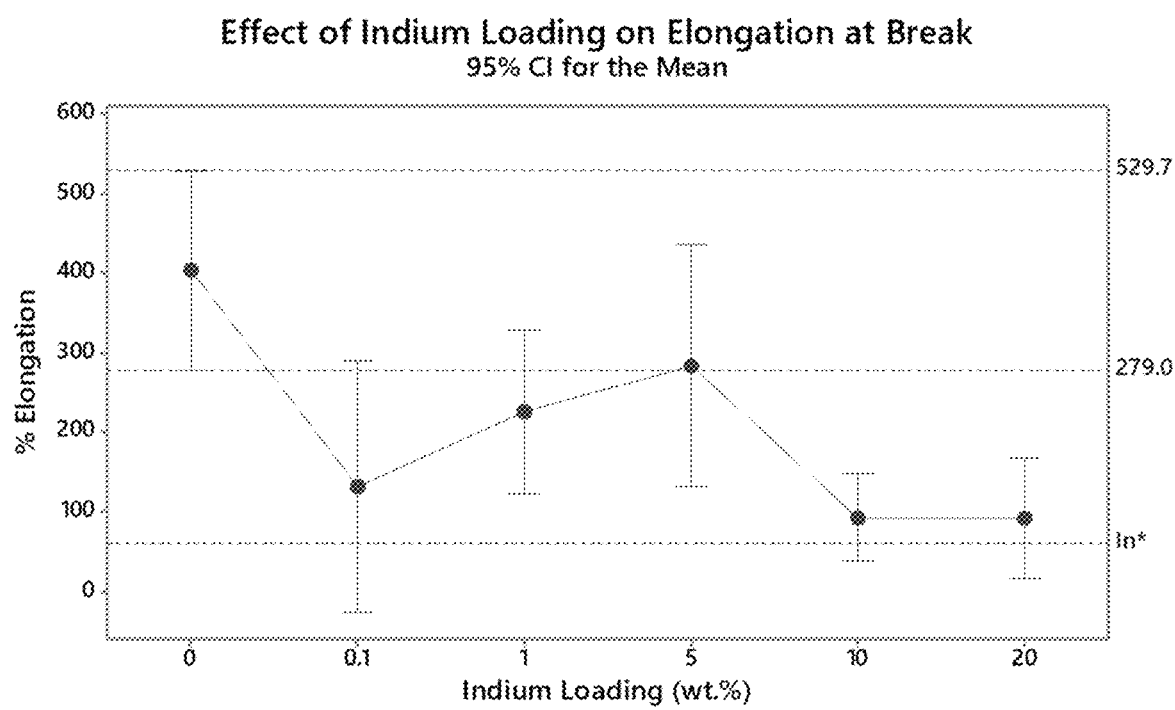
FIG. 10 shows the effect of indium loading on elongation at break.
Figure 11A:
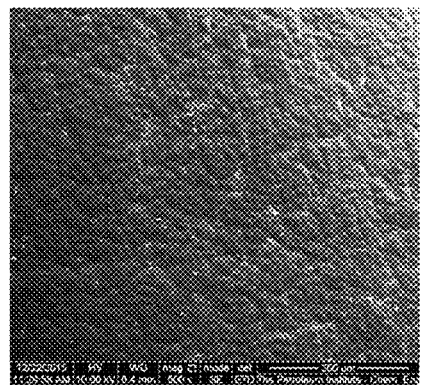
FIGS. 11A-11F show SEM micrographs of the surfaces of the material.
Figure 11B:
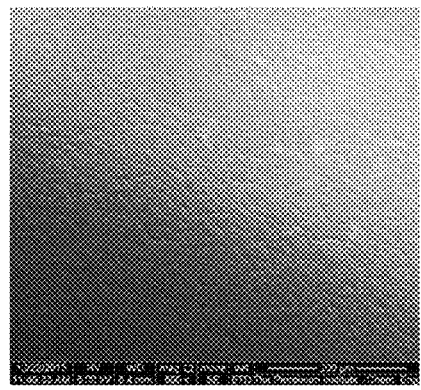
Figure 11C:
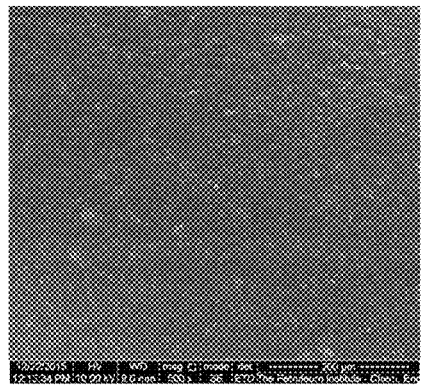
Figure 11D:
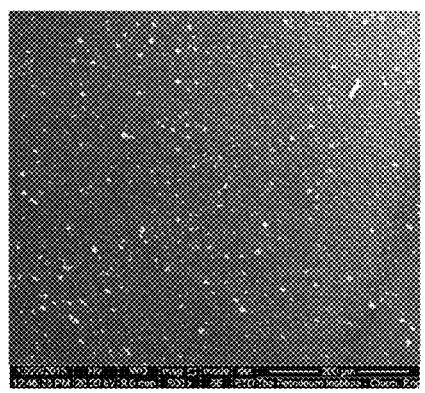
Figure 11E:
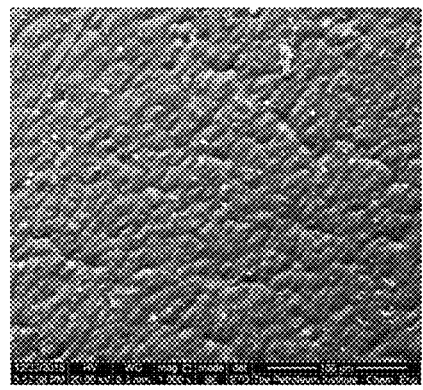
Figure 11F:
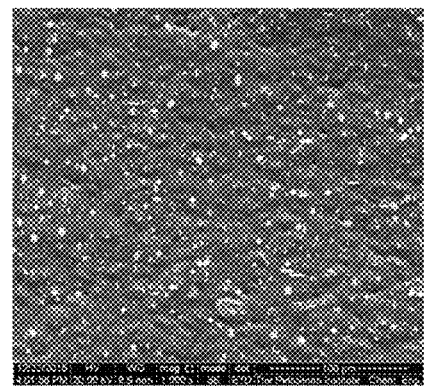

At constant extrusion conditions, it was also concluded statistically that elongation does not improve with increasing indium content as is shown clearly FIG. 10. This implies that amorphous indium fails in offering flexibility due to its brittleness and thus, breaks without demonstrating significant changes in strain. As a result, FIG. 10 indicates how the tested specimens raptured with elongation rate less than 1% confirming the brittleness effect of amorphous indium on HDPE.

FIG. 10 moreover indicates that increasing indium loading not only decreases precision between the data values, but also forces the composites to exhibit lower elongation values closed to that of pure indium 60%. This is confirmed statistically where there is a 95% level of confidence proving that elongation rates decrease with increasing indium content in the polymeric matrix. Accordingly, the loading effect hypothesis results conclude that 10 wt. % loading acts as a threshold concentration in obtaining highest modulus and strength improvements. Additionally, the 10 wt. % loading can also be considered as an onset value for the In-HDPE composites in adapting brittleness properties.

Since the applied tensile stress during the Universal Testing Machine (UTM) testing has acted as a vertical cold-drawing unit, In-HDPE fibers were also tested in this analysis to determine if formation of the In-HDPE fiber imposes any change in amorphous properties of the embedded metal (Indium). It was initially suspected to demonstrate significant loss in metallic amorphousity. However, FIG. 4 shows that the metallic-amorphous phase is attained where crystallinity increased by only 3.5%. The results shown in FIG. 4 confirm the reliability of the method in forming a sustained amorphous phase of the metallic clusters.

The surface structure is shown by SEM images in FIG. 11. These illustrate a neat dispersion of the glassy metal made using the method.

The metal-polymer composites known in the literature typically require complex processing stages which consequently leads to increased manufacturing costs with sophisticated scaling-up procedures. Remarkably, the results presented in this document have shown that 85±4% of added indium was found to be the minimum amount of created metallic amorphousity in HDPE extrudates. This proves that the fabricated composite structure by co-extrusion have created and maintained metallic amorphous dispersions in a faster and simplified technique that even resisted the suspected crystallinity improvements due to fiber formation and crystallinity kinetics.

In addition to that, it was statistically concluded that reinforcing HDPE with indium metal via co-extrusion have increased the polymeric rigidity by almost 40% proven by the marked improvement in elastic modulus where a maximum of 1052±31 MPa at 10 wt. % loading was achieved. While reviewing the previously studied, it is clearly validated that filling HDPE with indium metal by direct co-melting using the method of this disclosure has statistically reached a maximum increase in elasticity by 40% closed enough to the rigidity improvements demonstrated by high stiffness materials.

Figure 12:
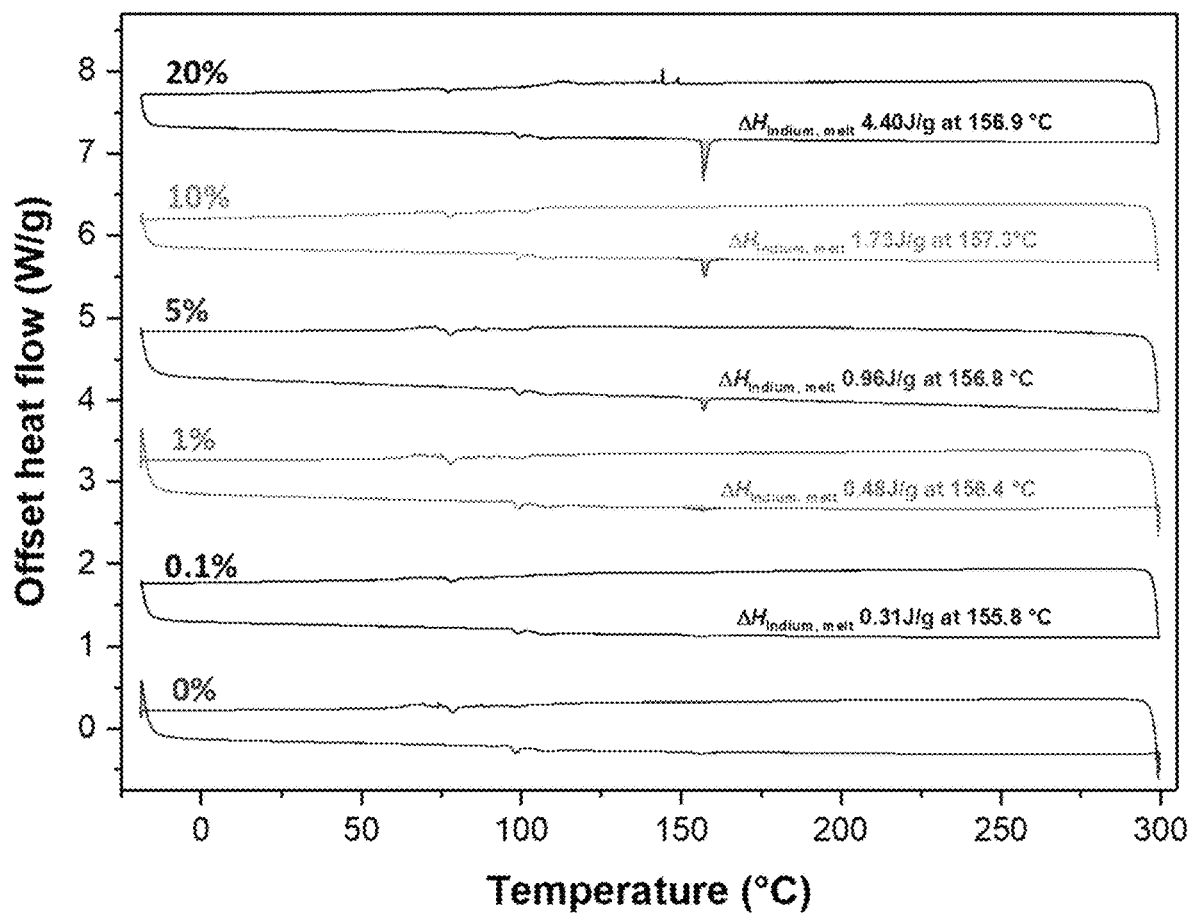
FIG. 12 shows DSC measurements of polystyrene/Indium.
Figure 13:
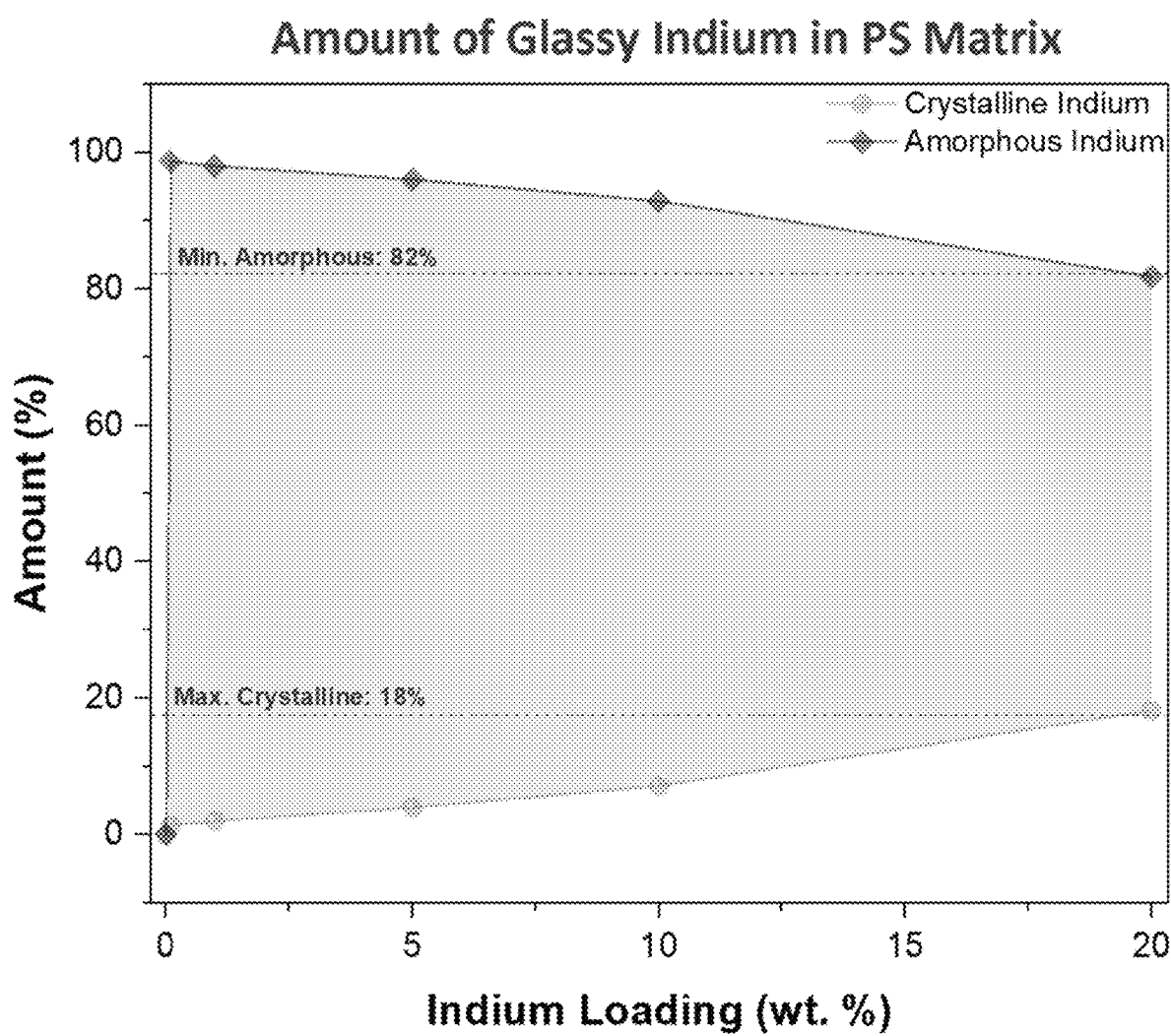
FIG. 13 shows the amount of amorphous indium in the polystyrene matrix.
Figure 14:
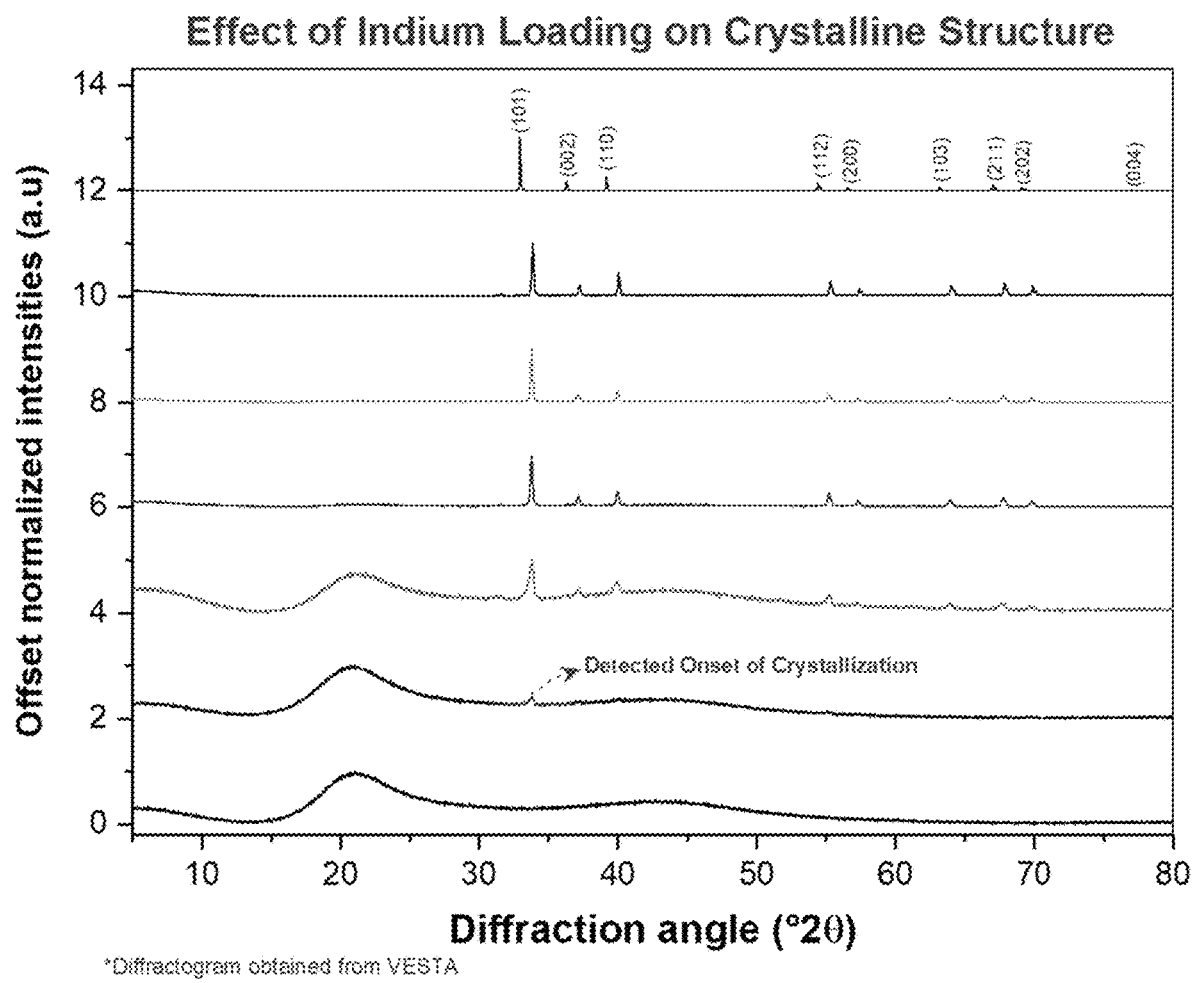
FIG. 14 shows the effect of indium loading on the polystyrene structure.

FIGS. 12-14 show similar figures for the work done with indium and polystyrene (PS); the polystyrene was obtained from Sigma-Aldrich. All the figures confirm the ability of direct co-melting as disclosed in this document in both creating and embedding amorphous metallic dispersions within a given polymeric matrix in a single stage operation. FIG. 12 shows DSC measurements, FIG. 13 shows the amount of amorphous indium in the polystyrene matrix. FIG. 14 shows the effect on indium loading on the polystyrene structure.

Figure 15:
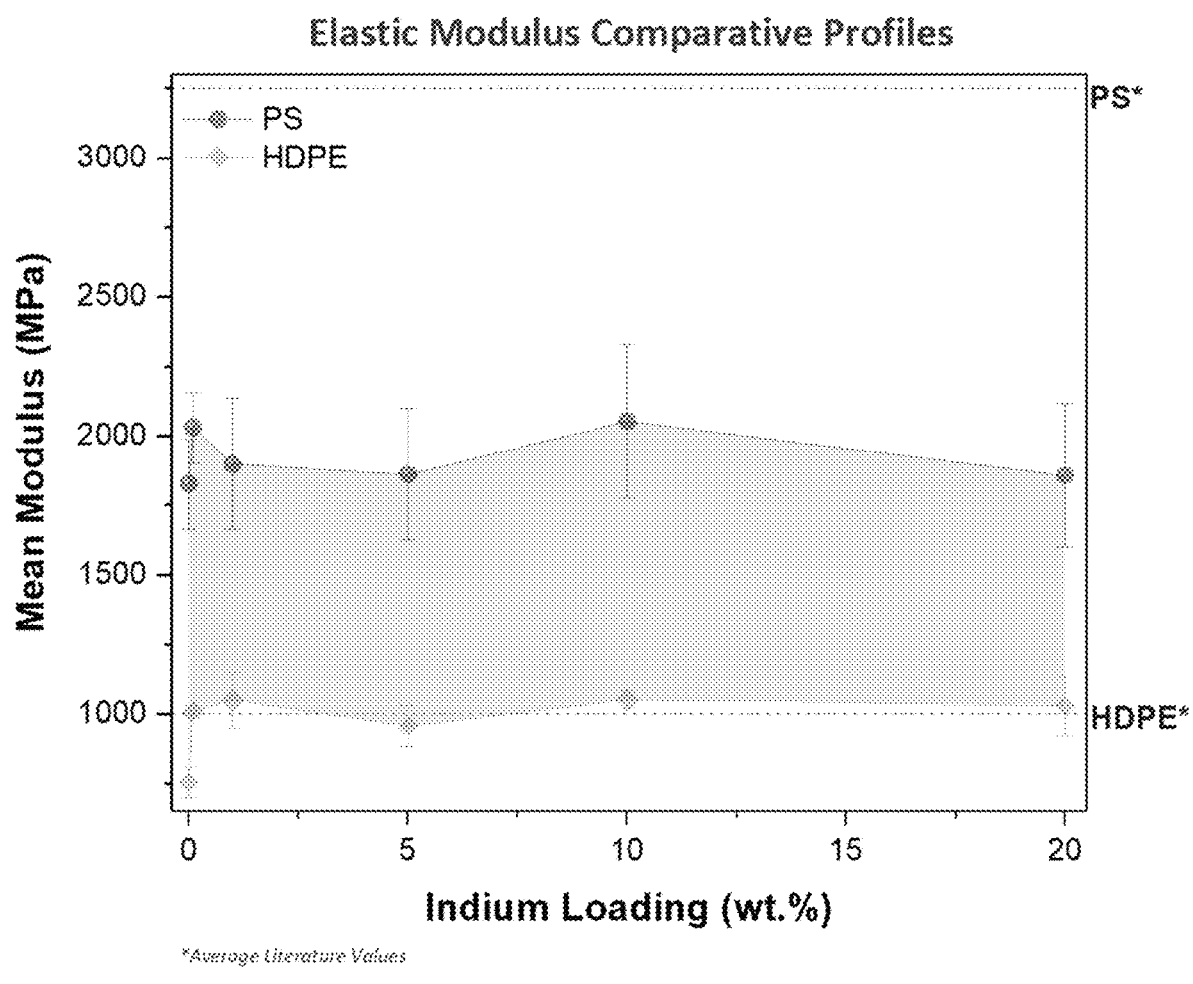
FIG. 15 shows the effect of indium loading on the elastic modulus profiles for both the polystyrene and the HDPE polymers.
Figure 16:
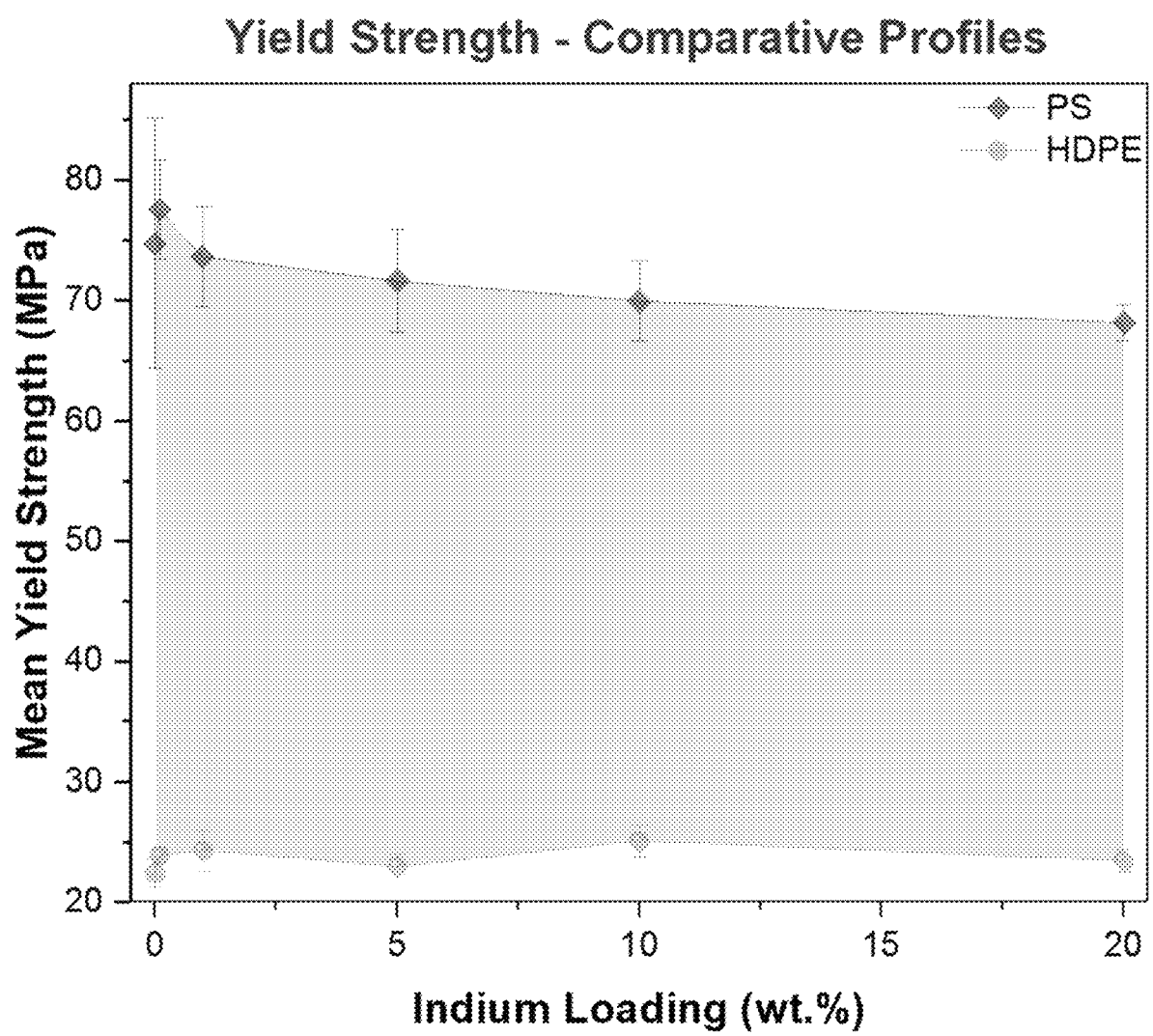
FIG. 16 shows yield strength profiles for both polystyrene and HDPE.

FIG. 15 shows the effect of indium loading the elastic modulus profiles for both the polystyrene and the HDPE polymers. It is interesting to note in FIG. 15 that the elastic behavior of the polystyrene was maintained. FIG. 16 shows comparative yield strength profiles for both polystyrene and HDPE. The variations in the mechanical yield strength profiles were expected since the HDPE and the PS matrices differ in their structural properties.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for the production of a glassy-metal polymer composite comprising the steps of:
    adding a polymer and a metal in a crystalline form to an extruder having an extruder barrel, wherein the extruder is heated to an extrusion temperature greater than the melting point of the polymer and the melting point of the metal; mixing the metal and the polymer in the extruder for a predefined residence time; and
    co-extruding a glassy-metal polymer composite from the extruder, wherein the metallic material in co-extruded glassy-metal polymer composite is in a non-crystalline amorphous form;
    wherein the metal is fed into the extruder barrel after the polymer at a gradual pace of five to fifteen seconds between each feed of the metal.

2. The method of claim 1, wherein the melting point of the metal is lower than the melting point of the polymer.

3. The method of claim 1, wherein the melting point of the metal does not exceed the melting point of the polymer by 35° C.

4. The method of claim 1, wherein the composite in form of a melt is extruded into a room temperature atmosphere after a minimum residence time of 10 minutes.

5. The method of claim 1, wherein the extruder barrel has conical screws and a feedstock of said polymer is added to the extruder, wherein the extruder barrel is firstly fed with a fraction of the feedstock of polymer to form a polymer layer on the surface of the conical screws.

6. The method of claim 1, wherein the extruder is a twin-screw extruder and the extruder barrel is a heated mixing barrel having twin counter-rotating conical screws.

7. The method of claim 1, wherein the metal is selected from group XIII of the periodic table, wherein a melting point of the metal does not exceed a melting point of the polymer by more than 35° C.

8. The method of claim 1, wherein the metal added to the extruder in a crystalline form is a liquid metal.

9. The method of claim 1, wherein the extruder is a screw extruder and has a rotation speed of 100 rotations per minute.

10. The method of claim 1, wherein the glassy-metal polymer composite is one of an In-HDPE and In-PS composite.

11. The method of claim 10, wherein a minimum of 85±4% of the one of an In-HDPE and In-PS composite is in an amorphous state embedded in the polymer matrix.

* * * * *